United States Patent [19]
Chan et al.

[11] Patent Number: 6,163,837
[45] Date of Patent: Dec. 19, 2000

[54] WRITING OF INSTRUCTION RESULTS PRODUCED BY INSTRUCTION EXECUTION CIRCUITS TO RESULT DESTINATIONS

[75] Inventors: Jeffrey Meng Wah Chan, Mountain View; Subramania Sudharsanan, Union City; Marc Tremblay, Palo Alto, all of Calif.

[73] Assignee: Sun Microsystems, Inc., Palo Alto, Calif.

[21] Appl. No.: 09/193,487

[22] Filed: Nov. 17, 1998

[51] Int. Cl.$^7$ ................................................ G06F 15/00
[52] U.S. Cl. ................................... 712/216; 712/225
[58] Field of Search ................................. 712/216, 225

[56] References Cited

U.S. PATENT DOCUMENTS

| | | | |
|---|---|---|---|
| 3,753,234 | 8/1973 | Gilbert et al. | 709/253 |
| 6,081,783 | 6/2000 | Divine et al. | 704/500 |

OTHER PUBLICATIONS

M. Deering, "Geometry Compression", Computer Graphics Proceedings SIGGRAPH 95 (Aug. 6–11, 1995), pp. 13–20.
E. Angel, "Interactive Computer Graphics: A–Top Down Approach with OpenGL" (1997), pp. 13–20.
J.D. Foley et al., "Computer Graphics: Principles and Practice" (1996).

*Primary Examiner*—William M. Treat
*Attorney, Agent, or Firm*—Skjerven Morrill MacPherson LLP; Michael Shenker

[57] ABSTRACT

Two instruction executions circuits C1 and C2, possibly pipelined, share a write port to write instruction results to their destinations. When both circuits have results available for writing in the same clock cycle, the write port is given to circuit C1. Circuit C2 gets the write port only when there is a bubble in the write back stage of circuit C1. Circuit C2 executes instructions that occur infrequently in an average program. Examples are division, reciprocal square root, and power computation instructions. Circuit C1 executes instructions that occur more frequently. Circuits C1 and C2 are part of a functional unit of a VLIW processor.

28 Claims, 5 Drawing Sheets

WRITING OF INSTRUCTION RESULTS PRODUCED BY INSTRUCTION EXECUTION CIRCUITS TO RESULT DESTINATIONS

BACKGROUND OF THE INVENTION

The present invention relates to processors that have two or more instruction execution circuits.

A computer processor typically has different instruction execution circuits for executing different instructions. For example, floating point division and reciprocal square root instructions can be executed by one circuit, and multiplication instructions by another circuit.

The results of instructions executed by different circuits are written to some destination, for example, to a memory or a register file. The results from different circuits may become available in the same clock cycle for being written to their respective destinations. Therefore, some processors provide a separate write port for each circuit so that all the circuits can write their results to the destinations in the same clock cycle.

However, providing multiple write ports for a memory or a register file reduces the memory or register file speed and increases their size and complexity. Therefore, sometimes separate write ports are not provided, but instead a write port is shared by different instruction execution circuits. When one circuit writes its result, the other circuit is stalled. For example, if circuits C1 and C2 have results available for writing in the same clock cycle, circuit C1 writes its result, and circuit C2 is stalled. Then circuit C2 writes its result, and circuit C1 is stalled. Then circuit C1 writes its next result again, and circuit C2 is stalled. Thus, as long as both circuits have results available for writing, they use the write port in a round-robin fashion.

It is desirable to improve the write port sharing techniques to increase the processor throughput.

SUMMARY

Some embodiments of the present invention provide improved techniques for sharing write ports that write instruction results to their destinations. Thus, in some embodiments, the write port is given to circuit C1 as long as the circuit C1 has a result available for writing. If circuit C2 also has a result available for writing, the circuit C2 is stalled. The circuit C2 is given the write port only when C1 has no result available for writing.

In some embodiments, instructions executed by C1 are more frequent than instructions executed by C2. Thus, in some embodiments, C1 executes add, subtract and/or multiply instructions, and C2 executes division and reciprocal square root instructions and instructions that compute a power of a number. In many programs, including for example many computer graphics processing programs, the division, reciprocal square root, and power instructions are infrequent. The instructions executed by C1 are frequent. However, sometimes C1 has no results available for writing. This may be due to instruction or data dependencies that delay instruction issue to the circuit C1. This may also be due to a trap condition. The results of C2 are written to their destinations when C1 has no result available for writing. Therefore, the processor throughput is as high as if separate write ports were provided for C1 and C2 as long as the following conditions hold:

(1) the absence of a result available for writing from C1 is not due to a dependency of a C1 instruction on a C2 instruction, and, more generally, (2) results of C2 instructions are written before they can stall subsequent instructions.

Even if the conditions (1) and (2) are not true at all times, the processor throughput is high since the total number of stalls due to write port sharing is reduced.

In some embodiments, a processor is a VLIW (very long instruction word) processor. Each VLIW instruction packet includes a number of instructions executed by separate functional units of the processor. The circuits C1 and C2 are part of one functional unit. At most one instruction is issued to the combination of circuits C1 and C2 in any given clock cycle. However, circuits C1 and C2 have different latencies. Therefore, the two circuits can provide instruction results in the same clock cycle, competing for a write port. When this happens, the C2 instruction having results available for writing is stalled.

When the C2 instruction is stalled waiting for the write port, the circuit C1 and the other functional units continue to execute other instructions. If any of these instructions have a dependency on the stalled instruction, the entire VLIW packet containing an instruction having a dependency is stalled via an interlock. When the packet is stalled, no instructions are issued to C1, and eventually C1 will have no result available for writing. When that occurs, the result of C2 is written to its destination.

While interlocks are provided to enforce dependencies on C2 instructions, in some embodiments no interlocks are provided to enforce dependencies on C1 instructions. The compilers and the assembly language programmers are expected to know the instruction latencies and to generate programs that execute correctly in the absence of interlocks for C1 instructions. When a C1 instruction is stalled, all the subsequent instructions wait for the stall to be removed. Therefore, knowledge of instruction latencies is sufficient to generate programs executing correctly.

Some embodiments include multiple write ports that can write multiple instruction results at the same time. However, in some embodiments, at least one of circuits C1 can also provide multiple instruction results at a time. For example, C1 or C2 or both may each include multiple instruction execution pipelines for executing different kinds of instructions. In some embodiments, C1 can provide up to N1 results at a time where $N1 \geq 1$. In this case, more than N1 results from C1 can be written while a C2 result waits to be written. In some embodiments, instructions executed by C1 are more frequent than instructions executed by C2. Therefore, high throughput is achieved.

In some embodiments, while a C2 result waits to be written, the circuit C2 can execute other instructions.

Other features and advantages of the invention are described below. The invention is defined by the appended claims.

DESCRIPTION OF PREFERRED EMBODIMENTS

Figure 1:
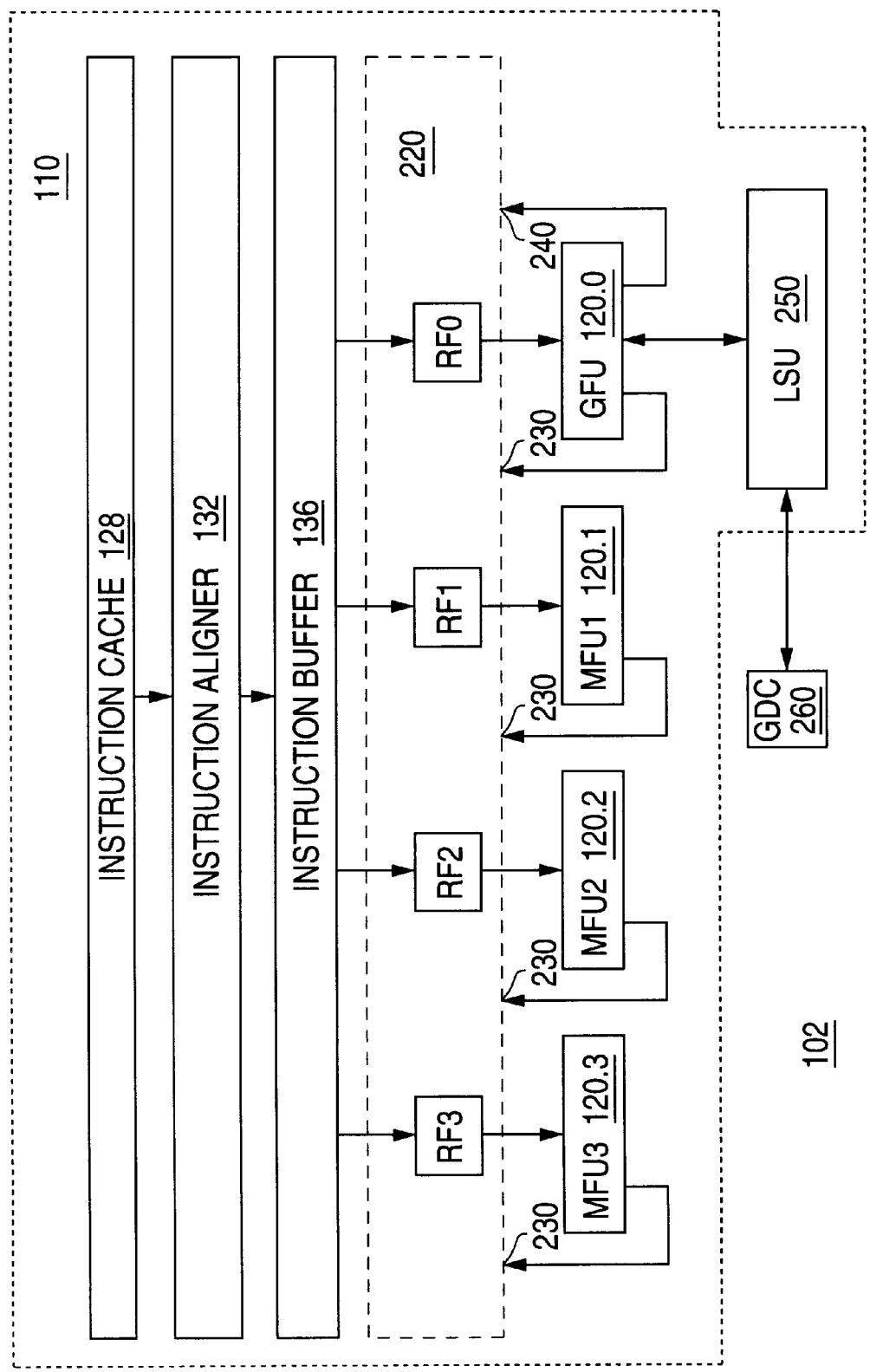
FIG. 1 is a block diagram of a computer system including a processor according to the present invention.

FIG. 1 is a block diagram of a computer system 102 including a pipelined VLIW (very long instruction word)

microprocessor 110. Processor 110 has four functional units 120.0, 120.1, 120.2, 120.3, also labeled GFU, MFU1, MFU2, MFU3 respectively. GFU stands for "general functional unit". MFU stands for "media functional unit". The four functional units execute in parallel a single VLIW instruction packet which may include up to four sub-instructions. Each functional unit executes a single instruction of the VLIW packet.

Each functional unit 120 is pipelined, and different pipelines may have different latencies. The functional units' pipelines are part of an overall VLIW instruction pipeline 210 shown in FIG. 2. In the fetch stage F of pipeline 210, the processor fetches instructions from instruction cache 128 to instruction aligner 132. In the align stage A, instruction aligner 132 extracts up to four sub-instructions from cache 128 and aligns the sub-instructions before respective functional units 120. The instructions are written into instruction buffer 136.

The remaining pipeline stages are executed by individual functional units 120 for respective individual sub-instructions. These stages are shown as pipelines 210G, 210M1, 210M2, 210M3 for respective functional units GFU, MFU1, MFU2, MFU3.

Each of these four pipelines represents in turn a number of pipelines some of which have different latencies, as described below.

In stage D/R (decode/register file access), each unit 120 decodes its respective instruction of the VLIW packet. If needed, units 120 also read instruction operands from respective register files RF0, RF1, RF2, RF3 in this stage. The four register files together form a register file 220. Each individual register file RF0, RF1, RF2, RF3 stores a copy of the same data.

In the execution stages E1, E2, E3, E4, the sub-instructions are executed by respective instruction execution circuits.

In trap stage T, trap events are handled. In this stage, the processor determines whether the instruction is to be canceled.

In write back stage WB, the instruction results are written to register file 220. For longer latency instructions, additional execution stages are inserted between stages T and WB.

A list of instructions and associated latencies for some embodiments is given in Addendum 1 at the end of this description.

For each functional unit 120, the register file 220 has a separate write port 230 (FIG. 1) through which the functional unit writes the instruction results to the register file. In addition, the register file has a separate write port 240 for GFU 120.0 to write results of load instructions to the register file. Each of ports 230, 240 is connected to a separate write port (not shown) in each of register files RF0, RF1, RF2, RF3. Thus, each register file RF0, RF1, RF2, RF3 has five write ports.

Figure 2:
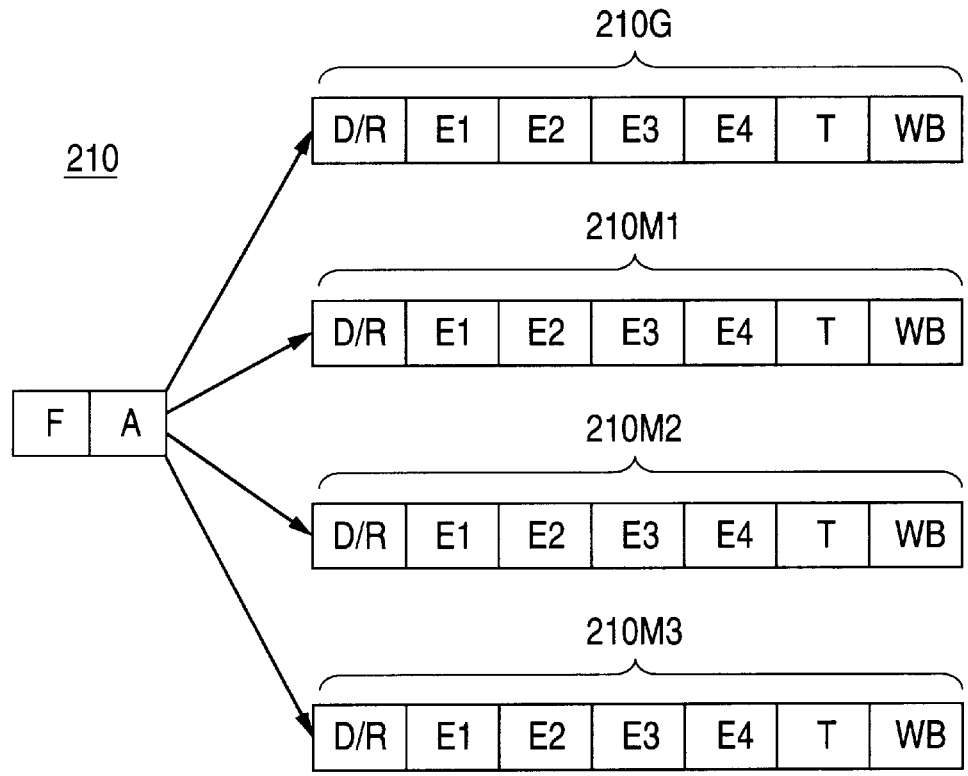
FIGS. 2–4 illustrates instruction execution pipelines in a processor of FIG. 1.
Figure 3:
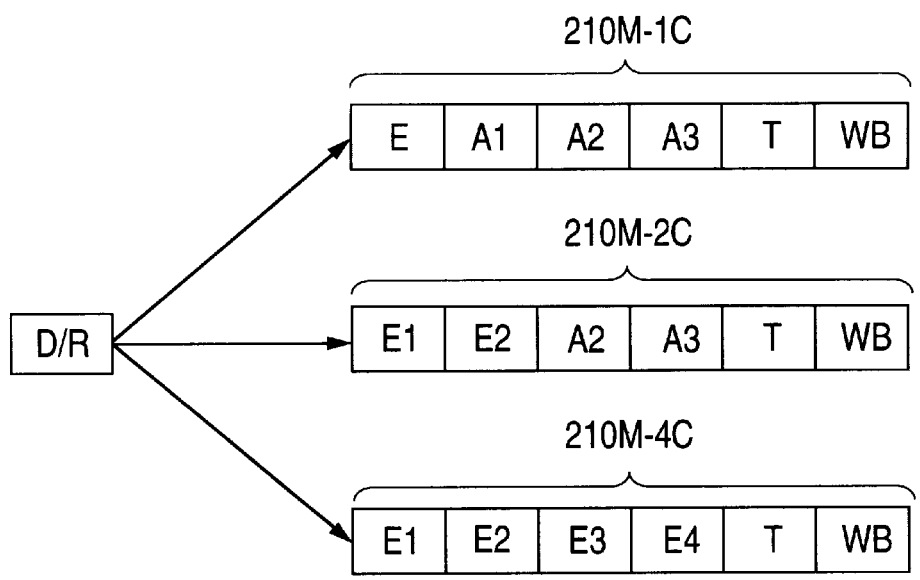

FIG. 2 shows only one pipeline for each unit 120 for simplicity. In the embodiment being described, each MFU includes three instruction execution pipeline circuits as shown in FIG. 3. These pipelines receive instructions from the common stage D/R of the MFU. Pipeline 210M-1C executes one clock cycle latency instructions, that is, instructions that need only one clock cycle E to execute. Stage E in pipeline 210M-1C is the same as E1 in FIG. 2. Stages E2, E3, E4 are shown as A1, A2, A3. These are "annex" stages inserted to ensure exactly four clock cycles between stages D/R and T.

Pipeline 210M-2C executes two cycle latency instructions. Stages E3, E4 are shown as annex stages A2, A3.

Pipeline 210M-4C executes four cycle latency instructions.

The term "latency" as used above in connection with FIG. 3 denotes the number of executions stages (E stages) needed to execute an instruction. This is also the number of clock cycles needed to execute an instruction assuming each pipeline stage takes one clock cycle and the instruction does not get stalled. This latency should be distinguished from "pipeline" latency which is the total number of clock cycles needed for the pipeline to process an instruction assuming the instruction is not stalled. If each stage takes one clock cycle, the pipeline latency is the number of stages in the pipeline. Thus, pipelines 210M-1C, 210M-2C, 210M-4C have the same pipeline latency.

Some embodiments include non-pipelined and even non-clocked instruction execution circuits. "Circuit latency" is the total time needed for the circuit to process an instruction assuming the instruction is not stalled. Thus, for a pipelined circuit, "circuit latency" is the same as "pipeline latency".

Since all of the three pipelines of FIG. 3 receive at most one instruction (from stage D/R) in any given clock cycle, and all the three pipelines have the same pipeline latency, at most one instruction is in the WB stage in any given clock cycle. (Of note, if an instruction is stalled in one of these pipelines, the subsequent instructions are also stalled, in stage E or earlier, see Addendum 2. Hence, different instructions do not reach the WB stage in the same clock cycle.) Therefore, there is no contention among the three pipelines for access to the write port 230 (FIG. 1) of the MFU.

Figure 4:
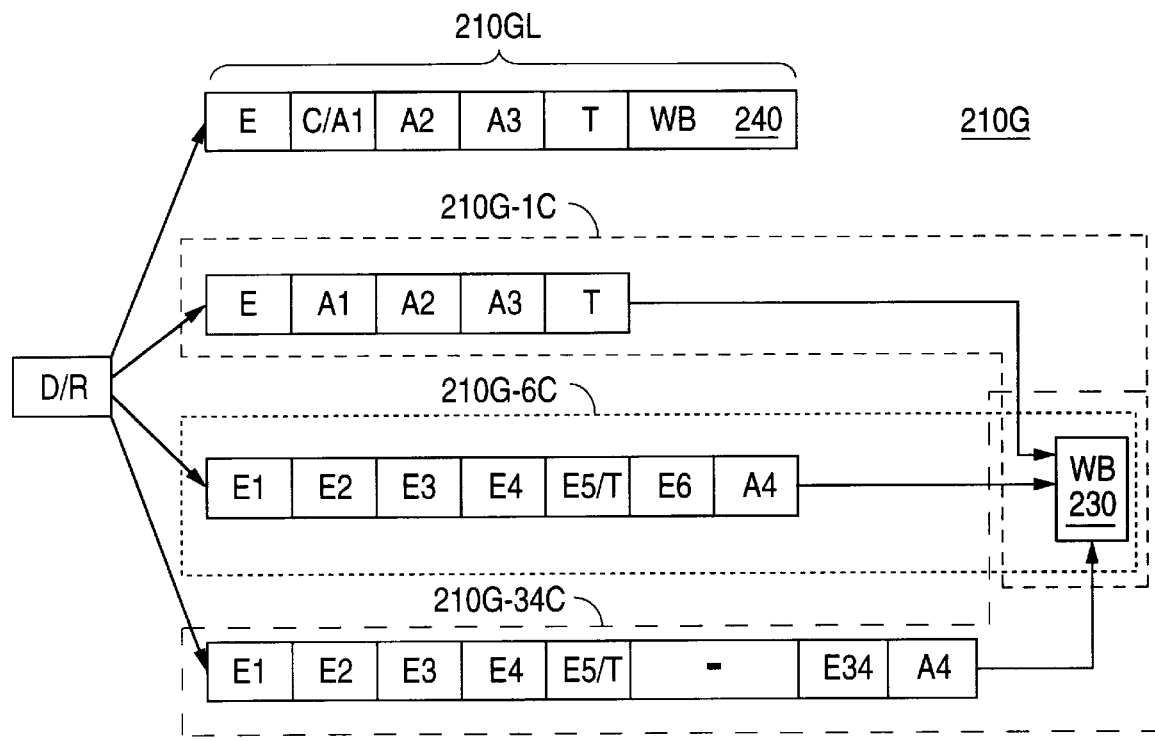

The GFU includes pipelines of different pipeline latencies, as shown in FIG. 4. These pipelines receive instructions from the common D/R stage of the GFU. Pipeline 210 GL executes memory access instructions (such as register loads). This pipeline communicates with a microprocessor data cache (not shown) and an external memory (not shown) via load/store unit (LSU) 250 shown in FIG. 1. This is a variable latency pipeline. Its latency depends on whether there was a cache miss. The minimum time in which a load result becomes available to other instructions is two clock cycles. Stage E1 is shown as E, and stage E2 is shown as C/A1 (C stands for cache access). This pipeline has its own write port 240 to write to the register file, and therefore this pipeline does not compete for a write port with any other pipeline.

In some embodiments, execution of memory store instructions is not pipelined in the GFU. The store instructions are issued to LSU 250 in the E stage, and are pipelined in the LSU.

GFU pipelines 210G-1C, 210G-6C, 210G-34C share write port 230 at stage WB. (In some embodiments, not only the write port but the whole stage WB circuitry is shared by the three pipelines.) The one-cycle pipeline 210G-1C executes one cycle latency instructions (i.e., instructions requiring only one E stage). Annex stages A1, A2, A3 delay the trap stage, as in pipeline 210M-1C of FIG. 3.

Pipeline 210G-6C executes six cycle latency instructions, and pipeline 210G-34C executes 34 cycle latency instructions, where "latency" is the number of E stages. These two pipelines are called "long latency pipelines" herein. The trap stage T in these pipelines coincides with the execution stage E5. In addition to the execution stages (E1 through E6 for pipeline 210G-6C, E1 through E34 for pipeline 210G-34C), an annex stage A4 is appended after the last execution stage, right before WB. Stage A4 is omitted in some embodiments.

Figure 8:
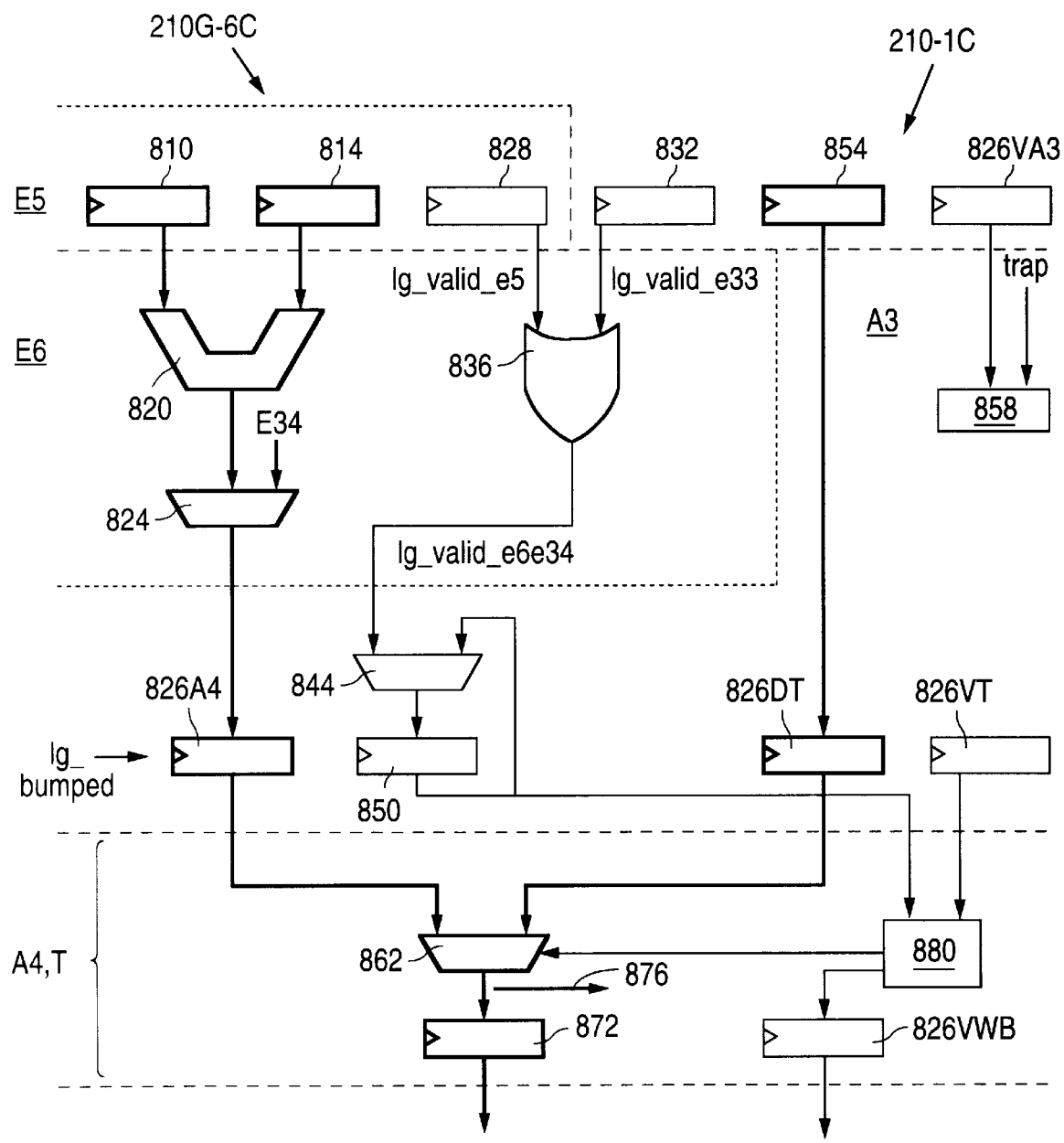
FIG. 8 is a circuit diagram of a portion of the processor of FIG. 1.

When there is a conflict between a long latency pipe (210G-6C or 210G-34C) and one-cycle pipe 210G-1C, the GFU port 230 is given to the one cycle pipe, while the result of a long latency instruction is held in a stage A4 register (register 826A4 in FIG. 8; this register is at the boundary of stages A4 and E6, and is sometimes referred to as a stage E6 register.) Thus, the GFU port 230 is given to the one-cycle pipe 210G-1C as long as there is an instruction in stage T of that pipeline. Port 230 is given to pipe 210G-6C or 210G-34C only when there is a bubble in stage T in pipe 210G-1C.

In some embodiments, only one instruction is allowed in the two pipelines 210G-6C, 210G-34C at any given time. Therefore, the two long latency pipelines never contend for the write port with each other. In some embodiments, allowing only one instruction in the long latency pipelines does not slow down the processor because the instructions executed by these pipelines (integer and floating point division, reciprocal square root, and power; see Addendum 1) occur infrequently in an average program executed by the processor.

Figure 5:
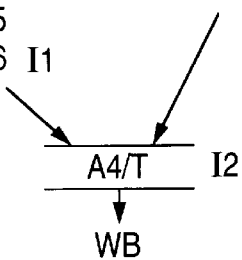
FIGS. 5–7 illustrate resolving contention for a write port between two instruction execution circuits.
Figure 6:
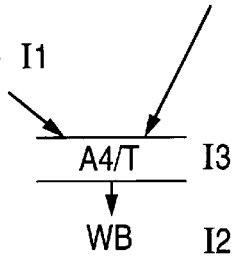
Figure 7:
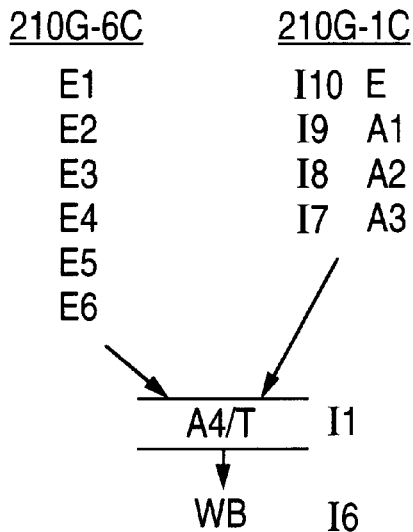

FIGS. 5–7 illustrate a possible conflict between pipelines 210G-1C, 210G-6C. In these figures, stages A4 and T share circuitry, and only one instruction is allowed in these stages at any time. The GFU receives instructions I1, I2, I3, . . . , in that order. Instruction I1 is a six cycle instruction, and the remaining instructions are one cycle. When instruction I1 is in stage E6 of pipe 210G-6C, the stage A3 of pipe 210G-1C has a valid instruction I3. These instructions compete for access to the A4/T circuitry and ultimately the WB circuitry including the GFU port 230. The A4/T circuitry (FIG. 6) is given to the one cycle pipeline, while the result of instruction I1 waits in stage E6.

Also shown in FIG. 6 is a bubble in stage E of pipeline 210G-1C. The bubble may be a result of a NOP in the GFU slot of a VLIW packet. NOPs may be inserted to handle instruction or data dependencies. The VLIW packet containing a NOP for the GFU can contain non-NOP instructions for one or more of the MFUs.

A bubble may also result from a trap. When a trap occurs, all the instructions in stages T and earlier stages are invalidated. However, in some embodiments, the invalidated instructions proceed through all of their execution, annex, trap, and WB stages. In stage WB, writes to the register files and the data cache are suppressed. While the invalidated instructions proceed through their stages, no new instructions are issued to the E stages, and therefore bubbles result.

When the bubble reaches stage T (FIG. 7), the A4/T circuitry is given to pipeline 210G-6C. In the next clock cycle the instruction I1 goes to stage WB, and the I1 result gets written to the register file 220. Thus, no instruction is stalled except the instruction I1. More generally, I1 does not stall any instruction unless a stall is needed to enforce a dependency of the instruction I1 with a subsequent GFU or MFU instruction or to prevent another long latency instruction from catching up with I1.

In some embodiments, the result of the instruction I1 is bypassed to units 120.0, 120.1 from stage E6/E34. In some embodiments, the result is bypassed to all the functional units 120 from stage E6/ E34. This reduces the frequency of stalls needed to enforce true dependencies (write-read dependencies).

In some embodiments, the result is bypassed to all the units 120 from stage A4.

High execution speed is achieved because: (1) in many programs the long latency instructions are infrequent, and further (2) the bubbles in pipe 210G-1C that are not caused by long latency instructions are sufficiently frequent so that the long latency instructions do not cause execution delays. Examples of such programs are some computer graphics geometry processing programs. In particular, in some embodiments, system 102 includes geometry decompression unit (GDC) 260, shown in FIG. 1. GDC 260 can read and decompress compressed computer geometry data. In some embodiments, the geometry data include vertex coordinates, normal vector coordinates, and color and lighting parameters, as described in U.S. patent application Ser. No. 09/164,074, entitled "Methods and Apparatus for Processing Computer Graphics Geometry Data" filed on Sep. 30, 1998 by J. Chan and incorporated herein by reference. See also Michael Deering, "Geometry Compression", Computer Graphics Proceedings SIGGRAPH 95 (Aug. 6–11, 1995), pages 13–20, incorporated herein by reference; and J. D. Foley et al., "Computer Graphics: Principals and Practice" (1996) incorporated herein by reference. The GFU 120.0 reads the decompressed data from the GDC via the LSU 250 and writes the data to register file 220. Processor 110 processes the decompressed data to display respective objects on a computer screen (not shown). The processing involves transformation from object coordinates to world and/or screen coordinates, and also involves color and lighting computations. In some programs described in the aforementioned application Ser. No. 09/164,074, the long latency operations such as division, reciprocal square root, and power computations, are infrequent. Therefore, the instructions can be scheduled so that the pipeline 210 G-1C and the MFU pipelines do not have to be stalled for long latency operations.

In some embodiments, no interlocks are provided for instructions executed by pipe 210G-1C or by any MFU pipeline. The compilers and the assembly programmers are expected to know the latencies of these instructions and to produce code that will execute correctly without interlocks for these instructions. Here, "latency" is the number of stages before the instruction result can be bypassed to subsequent instructions. (Of note, in some embodiments a bypass within the same unit 120 can be available earlier than a bypass between different units. See Addendum 2.) The knowledge of these latencies allows the programmers and compilers to provide for true dependencies in the absence of interlocks.

Output dependencies between instructions executed by pipeline 210G-1C and the MFU pipelines are not an issue because the results of these pipelines are written in order. The results are written in order because: (1) the pipeline 210G-1C and all the MFU pipelines have the same pipeline latencies, and (2) if an instruction is stalled in one of these pipelines, then all the subsequent instructions are also stalled.

In embodiments in which the instructions are issued in order (this includes VLIW embodiments), antidependencies (i.e. read-write dependencies) do not cause incorrect execution.

Interlocks are provided for memory access instructions since these instructions have unpredictable latencies. Here "latency" is measured to the time the instruction result becomes available to other instructions. For load instructions, latencies measured to the time the result gets written to register file 220 are also unpredictable. Further, if a load is delayed (because of a cache miss, for example), the pipelines of units 120 can continue to run, and they can read or write the register file. Therefore, interlock circuitry is provided to stall these pipelines if needed to enforce a dependency.

The long latency instructions have unpredictable latencies measured to the time the instruction result is written to register file 220. Further, when the long latency pipelines are stalled due to port 230 contention, the remaining pipelines of units 120 can continue to run. Therefore, an interlock is provided to enforce dependencies of the long latency instructions with subsequent VLIW instructions. An interlock is also used to stall a subsequent long latency instruction when a preceding long latency instruction is bumped, whether or not there is a dependency between the two instructions.

In those embodiments which allow only one instruction in the long latency pipelines at any given time, only one scoreboard entry is needed to implement the interlock, as described in more detail below. Therefore, interlock circuitry is simplified.

Other embodiments do not have interlocks for the long latency instructions. If a long latency instruction I1 has a dependency with a subsequent instruction I2, or if the instruction I2 is also a long latency instruction with or without a dependency on I1, the compilers or the programmers can insert a NOP into the GFU code to cause a bubble in the A3 stage of pipeline 210G-1C when the instruction I1 is in stage E6. Alternatively, a NOP may be inserted in a later clock cycle so that whether or not the instruction I1 is bumped, I1 will clear stage WB sufficiently early not to stall I2.

FIG. 8 illustrates portions of GFU pipeline circuitry. The data path is shown in thick lines, and the control path in thin lines. Latches 810, 814 provide results of stage E5 of pipe 210G-6C to respective inputs of adder 820 in stage E6. The adder output is connected to one input of multiplexer 824 in stage E6. The other input of multiplexer 824 receives data that are in stage E34 of pipe 210G-34C. In the embodiment being described, only one instruction can be in the long latency pipelines at any given time.

The output of multiplexer 824 is latched by register 826 A4. Register 826A4 provides stage A4 data on its output. This register holds the result of a long latency instruction until the GFU port 230 becomes available. Register 826A4 is controlled by a signal lg_bumped. If lg_bumped is not asserted, register 826A4 is written.

On the control side, latch 828 drives a signal lg_valid_e5 indicating that the pipe 210G-6C had a valid instruction in stage E5 in the previous clock cycle. Latch 832 drives a signal lg_valid_e33 indicating that the pipe 210G-34C had a valid instruction in stage E33 in the previous clock cycle. These two signals are ORed by OR gate 836. The output lg_valid_e6e34 of gate 836 indicates a valid instruction in the last execution stage (E6 or E34) of a long latency pipeline. This signal is provided to one input of multiplexer 844. The multiplexer output is latched by latch 850. The output of latch 850 indicates a valid instruction in stage A4 (i.e., valid data in register 826A4). The output of latch 850 is connected to the other input of multiplexer 844. In each clock cycle in which the signal lg_bumped does not write-enable the register 826A4, multiplexer 844 selects the output of latch 850, thus recycling the multiplexer output signal.

In pipeline 210G-1C, register 854 provides the stage A3 data (the instruction results) to register 826DT. Register 826VA3 provides a "valid" signal for the data. Circuit 858 ORs the "valid" signal with a "trap" signal which indicates whether a trap condition necessitates the instruction in stage A3 to be canceled. The OR is a stage A3 valid signal, which is provided to register 826VT.

In stage T, registers 826DT and 826VT provide the T stage data and "valid" signals respectively. The data is delivered to one input of multiplexer 862. The other multiplexer input receives data from register 826A4. The output of multiplexer 862 is latched by register 872. (Of note, we use the terms "latch" and "register" interchangeably.) Register 872 provides the data to the WB stage and thus to GFU port 230. The output of multiplexer 862 is also bypassed to other instructions, as indicated by arrow 876.

Circuit 880 causes the multiplexer 862 to select the data from the T stage register 826DT if the "valid" signal from register 826VT is asserted. If this signal is deasserted, circuit 880 causes the multiplexer 862 to select the long latency data from register 826A4. Circuit 880 also generates a "valid" signal which is the OR of the outputs of registers 850, 826VT. This OR signal is latched by latch 826VWB which provides a "valid" signal for the output of register 872.

Figure 9:
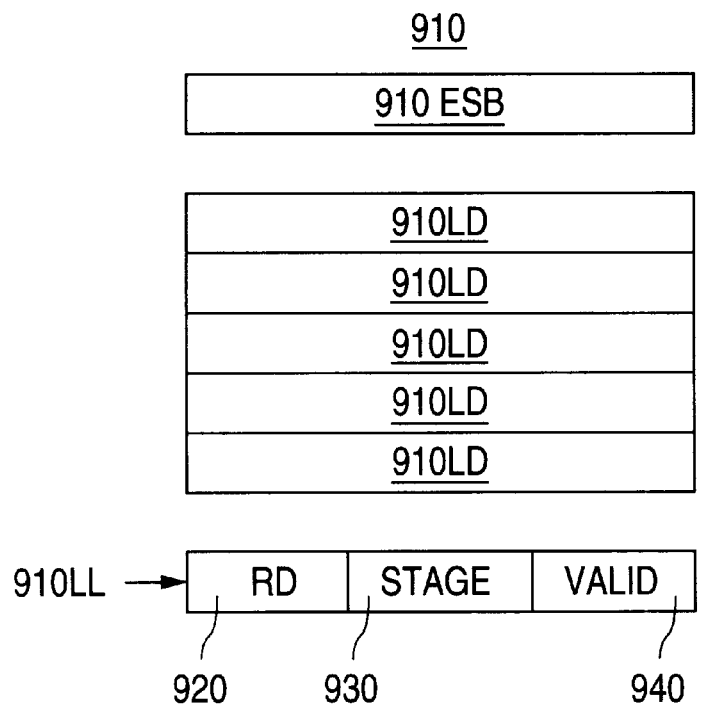
FIG. 9 diagrams a scoreboard used to implement interlocks in the processor of FIG. 1.

FIG. 9 illustrates scoreboard 910 which maintains information about unfinished loads and long latency instructions in the GFU to implement interlocks. Since in many programs long latency instructions are infrequent, the scoreboard has only one entry 910LL for the long latency instructions. In addition, a number of entries 910LD are provided for the loads. In some embodiments, the number of the load entries is equal to the number of entries in a load buffer (not shown) which is part of LSU 250 of FIG. 1. The load buffer has a separate entry for each load instruction which has been dispatched to the LSU.

Each scoreboard entry 910LL, 910LD has a destination register "rd" field 920 specifying the destination register of the respective instruction. Stage field 930 indicates the pipelined stage of the instruction. For load instructions, this field indicates whether the instruction is in stage A1, A2, A3, T, or past the stage T. For a long latency instruction, the stage field indicates whether the instruction is in stage E2, E3, E4, E5, or past E5. The stage field 930 is used to invalidate all the scoreboard entries with instructions in stage T or an earlier stage when a trap occurs.

Field 940 indicates whether the entry is valid.

In some embodiments, the load entries 910LD have additional fields indicating, for example, the number of destination registers of the load instruction.

A load or long latency instruction enters the scoreboard (i.e., instruction information is written to the scoreboard) when the instruction goes from stage D (that is, D/R) to stage E (i.e., stage E1). At this time, the scoreboard information is written to entry 910 ESB ("E-Stage entry"). Entries 910LL, 910LD are not written. When the instruction goes from stage E to stage A1/E2, the information from entry 910ESB is copied to an entry 910LD or 910LL, as appropriate. Entry 910ESB has an additional field to indicate whether the instruction is a load or a long latency instruction.

Only GFU instructions update the scoreboard. However, all the instructions of a VLIW packet access the scoreboard in stage D to check for dependencies. Therefore, in some embodiments, the scoreboard is reproduced in each functional unit 120.0 to facilitate reading the scoreboard.

The entry 910LL is reset (that is, made invalid) when the corresponding long latency instruction enters stage A4 "without getting bumped", that is, when a bubble enters stage T of the one cycle pipe 210G-1C.

If a long latency instruction I1 enters stage D before an older long latency instruction finishes, the instruction I1 stalls in stage D. All the instructions of the same VLIW packet are also stalled.

When the source register specifiers of a GFU or MFU1 instruction in the D stage are compared against the long latency entry 910LL, the result is qualified by signal lg_valid_e6e34 (FIG. 8) indicating whether a long latency operation is in the final execution stage (E6 or E34). If the long latency operation is in the final execution stage, the result of the operation can be bypassed from stage E6/E34, and thus no pipeline stall is needed.

If in a clock cycle N, there is a long latency operation in the final E stage (i.e. E6 or E34 ), and there is no valid instruction in stage A3 of pipeline 210G-1C, then the long latency entry 910LL is invalidated at the end of cycle N. Another long latency operation can enter the scoreboard in the next cycle. However, if there is a valid instruction in stage A3 of pipeline 210G-1C, the signal lg_valid_e6e34 remains asserted until the long latency instruction enters the A4 stage, and another long latency operation cannot enter the scoreboard.

If a dependency is discovered, an instruction may stall in stage D or E1 (the first execution stage, same as E for pipelines 210G-1C, 210GL). Different sub-instructions of the same VLIW packet can stall in different stages. However, if any sub-instruction enters the E1 stage, the instruction waits for the other instructions of the same packet to enter the E1 stage before execution proceeds.

An instruction stalls in the D stage if there is output dependency with the long latency entry 910LL and the long latency entry is not resetting the scoreboard in that cycle (that is, the entry is not being reset; this means that either lg_valid_e6e34 is not asserted or is asserted but the long latency operation is going to be bumped in that cycle). An instruction is also stalled in stage D if its destination or source register specifier matches the destination register specifier of entry 910ESB.

A long latency instruction stalls in stage D if the long latency entry 910LL is valid and is not being invalidated in that cycle. This stall occurs whether or not the long latency entry destination register specifier field 920 matches any source or destination register of the long latency instruction in stage D.

When a load or long latency instruction enters the scoreboard, the entry 910ESB is written at the rising edge of the clock which takes the instruction from stage D to stage E1 if the following conditions are true:

(1) A "trap" signal was not asserted in the D stage. The "trap" signal invalidates all the pipeline stages from F to T inclusive.

(2) No E1 stage instruction of a previous VLIW packet is stalled waiting for the instructions of the same packet.

The entry 910ESB is updated at the end of the D stage clock cycle even if the D stage load or long latency instruction stalls in stage D. This is done in order not to have to qualify the entry 910ESB update with a signal indicating a D stage stall. However, in the next clock cycle after the stall, all the scoreboard matches against the entry 910ESB are disqualified.

Other features of the scoreboard are described in Addendum 2.

The embodiments described above do not limit the invention. In particular, the invention is not limited by any particular pipeline structure or by any latencies. In some embodiments, some instruction execution pipelines such as 210G-6C, 210M-2C, and other pipelines, are replaced by non-pipelined instruction execution circuits. The term "pipeline" conventionally indicates a circuit in which different stages are separated by clocked registers and different stages can perform their function (e.g., execute different instructions) in parallel. However, as stated above, in some embodiments the long latency pipelines are allowed to have only one instruction at any given time, and hence these are not "pipelines" in the conventional sense. In some embodiments, a pipeline stage takes more than one clock cycle.

Different instruction execution circuits may or may not have shared circuitry.

The invention is not limited by the number of long latency entries or any other entries in the scoreboard, or by any particular scoreboard fields or structures.

In some embodiments, register files RF0, RF1, RF2, RF3 do not have a separate write port for each write port 230, 240. Instead, the register files buffer at least some of the data from write ports 230, 240, and the data are written to the register files later. At least some of the data buffered in a given clock cycle are written to the register files sequentially.

The invention is not limited to VLIW processors. The invention is not limited to clocked processors. Other embodiments and variations are within the scope of the invention, as defined by the appended claims.

Addendum 1

Instruction Set

The following tables list processor 110 sub-instructions for some embodiments. The instruction "latency" is the number of E stages needed to execute an instruction. The GFU long latency pipeline executing a long latency instruction can be determined from the instruction latency (latency of 34 for pipe 210G-34C, latency of 6 for pipe 210G-6C.)

GFU Instructions

| mnemonic | latency | operation |
|---|---|---|
| add | 1 | Add |
| addlo | 1 | Add integer lo |
| and | 1 | And |
| bnz | 1 | Branch not zero |
| bnzpt | 1 | Branch not zero, predict taken |
| bnzpn | 1 | Branch not zero, predict not taken |
| bz | 1 | Branch zero |
| bzpt | 1 | Branch zero, predict taken |
| bzpn | 1 | Branch zero, predict not taken |
| call | 1 | Call |
| cas | 2 | Compare and swap (atomic) |
| cmovnz | 1 | Conditional move if not zero |
| cmovz | 1 | Conditional move if zero |
| cmpeq | 1 | Compare equal |
| cmple | 1 | Compare less than or equal |
| cmplt | 1 | Compare less than |
| cmpult | 1 | Compare unsigned less than |
| cstb | 1 | Conditional store bytte |
| csts | 1 | Conditional store short |
| cstw | 1 | Conditional store word |
| cstl | 1 | Conditional store long |
| ctrap | 1 | Conditional trap |
| done | 1 | Return from trap |
| fabs | 1 | Single precision absolute value |
| fcmpeq | 1 | Single precision compare equals |
| fcmple | 1 | Single precision compare less than or equals |
| fcmplt | 1 | Single precision compare less than |
| fdiv | 6 | Float divide, (round nearest) |
| fdivrh | | |
| fdivrl | | Float divide round +infinity |
| fdivrn | | |
| fdivrz | | Float divide round − infinity |
| | | Float divide round nearest |
| | | Float divide round zero |
| fmax | 1 | Single precision maximum |
| fmin | 1 | Single precision minimum |
| fneg | 1 | Single precision negate |
| frecsqrt | 6 | Single precision reciprocal square root |
| getir | 1 | Get internal register |

GFU Instructions (continued)

| mnemonic | latency | operation |
|---|---|---|
| idiv | 34 | Integer divide |
| idivu | 34 | Integer divide unsigned |
| iflush | 1 | Flush icache |
| jmpl | 2 | Jump and link |
| ldb | 2 | Load byte |
| ldub | 2 | Load unsigned byte |
| ldg | 5 | Load group |
| ldl | 2 | Load long (pair) |
| lds | 2 | Load short |
| ldus | 2 | Load unsigned short |
| ldw | 2 | Load word |
| lduw | 2 | Load unsigned word |
| ldba1 | 2 | Load byte alternate space 1 |
| ldba2 | | Load byte alternate space 2 |
| lduba1 | 2 | Load unsigned byte alternate space 1 |
| lduba2 | | Load unsigned byte alternate space 2 |
| ldga1 | 2 | Load group alternate space 1 |
| ldga2 | | Load group alternate space 2 |
| ldla1 | 2 | Load long alternate space 1 |
| ldla2 | | Load long alternate space 2 |
| ldsa1 | 2 | Load short alternate space 1 |
| ldsa2 | | Load short alternate space 2 |
| ldusa1 | 2 | Load unsigned short alternate space 1 |
| ldusa2 | | Load unsigned short alternate space 2 |
| | 2 | Load word alternate space 1 |
| ldwa2 | | Load word alternate space 2 |
| lduwa1 | 2 | Load unsigned word alternate space 1 |
| lduwa2 | | Load unsigned word alternate space 2 |
| membar | 1 | Memory barrier |
| or | 1 | Inclusive or |
| pcst | 2 | Parallel conditional store |
| ppower | 6 | Parallel exponentiation |
| precsqrt | 6 | Parallel reciprocal square root |
| prefetch | 1 | Fill d-cache line |
| retry | 1 | Retry trapped instruction |
| return | 2 | pseudo-op jmpl |
| s2iw | 2 | Store to instruction word |
| sethi | 1 | Set high-order register half |
| setlo | 1 | Set low-order register half |
| setir | 1 | Set internal register |
| shll | 1 | Shift left logical |
| shra | 1 | Shift right arithmetic |
| shrl | 1 | Shift right logical |
| sir | | Software reset |
| softtrap | 2 | Generate software trap |
| stb | 1 | Store byte |
| stl | 1 | Store long |
| sts | 1 | Store short |
| stw | 1 | Store word |
| stba1 | 1 | Store byte alternate space 1 or 2 |
| stba2 | | |
| stla1 | 1 | Store long alternate space 1 or 2 |
| stla2 | | |

-continued

GFU Instructions

| mnemonic | latency | operation |
|---|---|---|
| stsa1 | 1 | Store short alternate space 1 or 2 |
| spsa2 | | |
| stwa1 | 1 | Store word alternate space 1 or 2 |
| stwa2 | | |
| sub | 1 | Subtract |
| swap | 2 | swap register with memory word |
| xor | 1 | Exclusive or |

MFU Instructions

| mnemonic | latency | operation |
|---|---|---|
| add | 1 | Add |
| ladd | | Long Add |
| addlo | 1 | Add integer lo |
| and | 1 | And |
| bitext | 2 | Bit extract |
| bndck | 1 | Bound check |
| byteshuffle | 2 | Byte extract |
| cccb | 1 | Count consecutive clear bits |
| clip | 1 | Clip |
| cmovnz | 1 | Conditional move if not zero |
| cmovz | 1 | Conditional move if zero |
| cmpeq | 1 | Compare equal |
| cmple | 1 | Compare less than or equal |
| cmplt | 1 | Compare less than |
| cmpult | 1 | Unsigned compare less than |
| cpick | 1 | Conditionally (zero) pick |
| ctrap | 1 | Conditional trap |
| dabs | 2 | Double precision absolute value |
| dadd | 6 | Double precision add |
| daddrn | | Double precision add round nearest |
| daddrh | | |
| daddrl | | Double precision add round +infinity |
| daddrz | | Double precision add round −infinity |
| | | Double precision add round zero |
| dcmpeq | 2 | Double compare equal |
| dcmple | 2 | Double compare less than or equal |
| dcmplt | 2 | Double compare less than |
| dmax | 2 | Double precision maximum |
| dmin | 2 | Double precision minimum |
| dmul | 8 | Double precision multiply (not fully pipelined) |
| dneg | 2 | Double precision negate |
| dsub | 6 | Double precision subtract |
| dsubrn | | Double precision add round nearest |
| dsubrh | | |
| dsubrl | | Double precision add round +infinity |
| dsubrz | | Double precision add round −infinity |
| | | Double precision add round zero |
| dtof | 4 | Double to float |
| dtofrn | | Double to float round nearest |
| dtofrh | | |
| dtofrl | | Double to float round +infinity |
| dtofrz | | Double to float round −infinity |

MFU Instructions

| mnemonic | latency | operation |
|---|---|---|
| | | Double to float round zero |
| dtoi | 4 | Double to integer |
| dtol | 6 | Double to long |
| fabs | 1 | Single precision absolute value |
| fadd | 4 | Single precision addition |
| faddrn | | Single precision addition round the nearest |
| faddrh | | |
| faddrl | | Single precision addition round +infinity |
| faddrz | | Single precision addition round −infinity |
| | | Single precision addition round zero |
| fcmpeq | 1 | Single precision compare equals |
| fcmple | 1 | Single precision compare less than or equals |
| fcmplt | 1 | Single precision compare less than |
| fix2flt | 4 | Fixed point to single precision |
| flt2fix | 4 | Single precision to fixed point |
| fmax | 1 | Single precision maximum |
| fmin | 1 | Single precision minimum |
| fmul | 4 | Single precision multiply |
| fmulrn | | Single precision multiply round nearest |
| fmulrh | | |
| fmulrl | | Single precision multiply round +infinity |
| fmulrz | | Single precision multiply rnd −infinity |
| | | Single precision multiply rnd zero |
| fmuladd | 4 | Single precision multiply-add |
| fmulsub | 4 | Single precision multiply-subtrac |
| fneg | 1 | Single precision negate |
| fsub | 4 | Single precision substraction |
| fsubrn | | |
| fsubrh | | Single precision substract rnd nearest |
| fsubrl | | Single precision subtract rnd +infinity |
| fsubrz | | Single precision subtract rnd −infinity |
| | | Single precision subtraction rnd zero |
| ftod | 4 | Float to double |
| ftoi | 4 | Float to int |
| ftol | 4 | Float to long |
| getir | 1 | Get internal register |
| itod | 4 | Integer to double |
| itof | 4 | Integer to float |
| lcmpeq | 1 | Long compare equal |
| lcmple | 1 | Long compare less than or equal |
| lcmplt | 1 | Long compare less than |
| lcmpult | 1 | Long compare unsigned less than |
| ltod | 4 | Long to Double |
| ltodrn | | Long to Double round nearest |
| ltodrh | | |
| ltodrl | | Long to Double round +infinity |
| ltodrz | | Long to Double round −infinity |
| | | Long to Double round to zero |
| ltof | 4 | Long to float |
| ltofrn | | Long to float round nearest |
| ltofrh | | |

-continued

MFU Instructions

| mnemonic | latency | operation |
|---|---|---|
| ltofrl | | Long to float round +infinity |
| ltofrz | | Long to float round −infinity |
| | | Long to float round to zero |
| mul | 2 | Multiply |
| muladd | 2 | Fused multiply-add |
| mulh | 2 | Multiply |
| mulsub | 2 | Fused multiply-subtract |
| muluh | 2 | Multiply |
| or | 1 | Inclusive or |
| pack | 1 | Pack |
| padd | 1 | Parallel add |
| padds | 1 | Saturating parallel add |
| pcmovnz | 1 | Parallel move if not zero |
| pcmovz | 1 | Parallel move if zero |
| pcmpeq | 1 | Parallel compare equal |
| pcmple | 1 | Parallel compare less than or equal |
| pcmplt | 1 | Parallel compare less than |
| pcmpult | 1 | Parallel compare less than unsigned |
| pdist | 4 | Pixel distance |
| pdotadd | 2 | Parallel dot product add |
| pdotsub | 2 | Parallel dot sroduct subtract |
| pmean | 1 | Parallel mean |
| pmul | 2 | Parallel multiply |
| pmuls | 2 | Saturating parallel multiply |
| pmuladd | 2 | Parallel mulitply add |
| pmuladds | 2 | Saturating parallel multiply add |
| pshll | 1 | Parallel shift left logical |
| pshra | 1 | Parallel shift right arithmetic |
| pshrl | 1 | Parallel shift right logical |
| psub | 1 | Parallel subtract |
| psubs | 1 | Saturating parallel subtract |
| sethi | 1 | Set high-order register half |
| setlo | 1 | Set low-order register half |
| setir | 1 | Set internal register |
| shll | 1 | Shift left logical |
| lshll | | Shift left logical long |
| shra | 1 | Shift right arithmetic |
| lshra | | Shift right arithmetic long |
| shrl | 1 | Shift right logical |
| lshrl | | Shift right logical long |
| sub | 1 | Subtract |
| lsub | | Subtract long |
| xor | 1 | Exclusive or |

Addendum 2

Bypasses

There is a full bypass between the GFU and the MFU 120.1. The results of instructions in units 120.0, 120.1 are bypassed to instructions in stage D in the two units in the clock cycle in which the results become available.

The result of a long latency instruction becomes available to stage D of units 120.0, 120.1 when the long latency instruction is in its final execution stage (E6 or E34).

If an instruction stalls in stage E1 due to a dependency on a previous load, the result of the load is bypassed to the stalled instruction in stage E1.

Of note, when an instruction stalls in stage D or E1, all the previous instructions continue to execute and are not stalled.

Annexes

Each functional unit 120 has an annex to temporarily hold the results of instructions that are in the annex stages A1, A2, . . . The results are staged in the annex and broadcast to the register files RF0, RF1, RF2, RF3 in stage T (or stage A4 for the long latency instructions) if there is no trap present. The register files latch the results locally and update the registers in the next clock cycle (stage WB).

The annexes contain the destination register specifiers and maintain the valid bits for all annex-stage instruction. The annexes also contain priority logic (not shown) to determine the most recent value for any register.

Table 2-1 below shows possible bypasses for GFU instructions. Level_1 has a higher priority than level_2, and so on. In other words, if the same destination register specifier appears at level 1 and level 2, the level 1 value is used because this value is more recent than the level 2 value.

Among the stages in the same level, there is no priority. A register specifier can appear in only one stage at any level in any given clock cycle.

TABLE 2-1

| | gfu | ldx | mfu1 | mfu2 | mfu3 | long |
|---|---|---|---|---|---|---|
| level_1 | E1 | ldx1 | E1 | | | E6E34 |
| level_2 | A1 | ldx2 | A1/E2 | | | A4 |
| level_3 | A2 | ldx3 | A2/E3 | | | |
| level_4 | A3 | ldx4 | A3/E4 | | | |
| level_5 | T | | T | T | T | |
| level_6 | WB | | WB | WB | WB | |
| level_7 | RF0 | | | | | |

In Table 2-1, "LDX" is a load annex. This annex includes stages ldx1, ldx2, ldx3, ldx4. When LSU 250 returns data for a load instruction, the data are written into stage ldx1. In the subsequent clock cycles, the data are shifted consecutively to stages ldx2, ldx3, ldx4. From stage ldx3, the data are written to the register files.

In the "long" column in Table 2-1, "E6E34" denotes a long latency instruction in the last execution stage.

Table 2-1 indicates, for example, that at level 1, data can be bypassed to the GFU stage D from the GFU stage E1, the load annex stage ldx1, the MFU 120.1 stage E1, or the long latency stage E6/E34. At level 5 data can be bypassed from stage T of the GFU, of any MFU, or of ldx (that is, from stage T of a load instruction.)

The bypass logic is implemented with comparators and multiplexers using methods known in the art. In particular, if a source register specifier of a D stage instruction matches a destination register specifier in the annex, the annex value is selected rather than the value returning from register file 220.

The bypass logic for MFU 120.1 is similar to the GFU. However, a GFU instruction can have up to four source operands while the MFU 120.1 has at most three source operands, and therefore the logic is slightly different.

The result of a long latency instruction can also be bypassed to MFUs 120.2, 120.3 from stage A4 if the result is selected by MUX 862. The following Table 3-1 shows possible bypasses for MFU 120.2. The bypasses for MFU 120.3 are similar. In fact, the two MFUs share the bypass logic.

TABLE 3-1

|  | mfu2 | mfu3 | mfu1 | gfu | ldx |
|---|---|---|---|---|---|
| level_1 | E1 |  |  |  | ldx1 |
| level_2 | A1/E2 |  |  |  | ldx2 |
| level_3 | A2/E3 |  |  |  | ldx3 |
| level_4 | A3/E4 |  |  |  | ldx4 |
| level_5 | T | T | T | T/A4 |  |
| level_6 | WB | WB | WB | WB |  |
| level_7 | RF2 |  |  |  |  |

Scoreboard checking with antidependency in the same group

A VLIW packet may contain the following instruction sequence.

| VLIW | MFU1 | GFU |
|---|---|---|
| vliw_0 |  | lg_0 ra,rb,r2 |
| vliw_1 | m1_1 r1,r2,r3 | ld_1 r4,r5,r1 |
| vliw_2 | m1_2 r1,r6,r7 | ld_2 r1,r8,r9 | vliw_0 contains a long latency instruction writing to register r2. vliw_1 contains an MFU 120.1 instruction m1_1 with registers r1, r2 as source specifiers and r3 as a destination specifier, and a gfu load writing to r1 (ld_1).

Since m1_1 has dependency with the previous long latency instruction, it stalls in the D-stage whereas ld_1 enters the E-stage in cycle 2 thus updating the entry 910ESB of the scoreboard. Since 'ld_1' is waiting for 'm1_1' to enter the E-stage, it asserts 'gf_local_stalle' (indicating a GFU E1-stage stall) in cycles 2, 3 and 4.

While 'm1_1' is stalled in the D-stage in cycles 2, 3 and 4, it should not see 'r1' in the scoreboard. This is done by qualifying all hits to the 'esb_entry' (i.e. entry 910ESB) with 'gf_local_stalle' not being present.

In cycle 5, 'gf_local_stalle' is deasserted and the load is sent to LSU 250. Since 'ld_2' and 'm1_2' have load_use_immediate dependency, they stall in the D-stage in cycle 5. If 'ld_1' is a cache hit returning data in cycle 6, 'm1_2' and 'ld_2' do not generate any E1-stage stalls.

Updating E-stage Scoreboard Entry in the Presence of gf-Stalld

If a load/long_latency instruction stalls in the D-stage, then it should not update the scoreboard so that it will not interlock against itself in the next clock cycle. Since the scoreboard write/reset pointers are generated in a single block ("gctl", not shown) and routed to all the scoreboards, qualifying the write pointer with a D-stage stall might become timing critical.

Hence, in some embodiments, a write to the esb_entry is not qualified by gf_stalld (a signal indicating a D-stage stall in the GFU). However, any hit to the esb_entry in any cycle is qualified by the absence of gf_stalld in the previous cycle.

This is shown in the following example.

| VLIW |  |  |  |  | GFU |  |  |  |  |  |  |  |
|---|---|---|---|---|---|---|---|---|---|---|---|---|
| Vliw_1 | MFU2 |  |  |  | MFU1 |  |  | ld_0 r1, r2, r3 |  |  |  |  |
| Vliw_2 | m2_1 r4, r5, r6 |  |  |  | m1_1 r3, r7, r8 |  |  | ld_1 r3, r10, r7 |  |  |  |  |
| cycle | 1 | 2 | 3 | 4 | 5 | 6 | 7 | 8 | 9 | 10 | 11 | 12 | 13 |
| ld_0 | D | E | A1 | A2 | A3 | T | WB |  |  |  |  |  |  |
| ld_1 |  | D | D | E | A1 | A2 | A3 | T | WB |  |  |  |  |
| m1_1 |  | D | D | E | A1 | A2 | A3 | T | WB |  |  |  |  |
| m2_1 |  | D | E | E | A1 | A2 | A3 | T | WB |  |  |  |  |

'ld_1' and 'm1_1' have 'load_use_immediate' dependency with 'ld_0'. 'ld_1' enters the E-stage entry 910ESB of the scoreboard at the end of cycle 1 (so that it is visible from cycle 2).

'ld_1' asserts a D-stage stall in cycle 2. This stall is staged (gf_stalld_d1) and any hit to the esb_entry in cycle 3 is disqualified by this signal. Thus, 'ld_1' does not see any hit from the esb_entry in cycle 3.

Similarly, 'm1_1' does not see any hit from the esb_entry in cycle 3.

Bypass/Stall Examples (Misc.)

In the following examples, for simplicity, all the instructions in the GFU are categorized as loads, alu_long (long latency instructions) and alu_short (instructions other than loads and long latency). Since the alu_short instructions are not scoreboarded, there can be two instructions with the same rd (destination register) specifiers. Hence, bypass logic needs to bypass the rd of the younger instruction correctly.

| cycle | 1 | 2 | 3 | 4 | 5 | 6 | 7 | 8 | 9 | 10 | 11 | 12 | 13 |
|---|---|---|---|---|---|---|---|---|---|---|---|---|---|
| lg_0 | E3 | E4 | E5 | E6 | A4 | WB |  |  |  |  |  |  |  |
| m1_1 | D | D | D | D | E | A1 | A2 | A3 | T | WB |  |  |  |
| ld_1 | D | E | E | E | E | A1 | A2 | A3 | T | WB |  |  |  |
| m1_2 |  |  |  |  | D | D | E | A1 | A2 | A3 | T | WB |  |
| ld_2 |  | D | D | D | D | D | E | A1 | A2 | A3 | T | WB |  |

The following combinations analyze what happens if two instructions have the same rd specifiers and a third instruction uses the rd. Below, "intrx" is any instruction.

---

Case A:

gfu instruction load r1,r2,r3
alu_short r4,r5,r3
instrx r3,r6,r7

---

Here alu_short has output dependency on load, and instrx has load_use dependency. 'alu_short' stalls in the D-stage. If load returns in cycle 3, then an actual D-stage stall signal is deasserted in cycle 4. Instrx in cycle 5 sees match in the ldx2-stage of the load annex (LDX) and in the E-stage. Since the E-stage has higher priority, it bypasses data from alu_short's results.

| | | | load -> alu_short -> instrx | | | | | | | | |
|---|---|---|---|---|---|---|---|---|---|---|---|
| cycle | 1 | 2 | 3 | 4 | 5 | 6 | 7 | 8 | 9 | 10 | 11 | 12 |
| load | D | E | A1 | A2 | A3 | T | WB | | | | | |
| alu_short | | D | D | D | E | A1 | A2 | A3 | T | WB | | |
| instrx | | | | D | E | A1 | A2 | A3 | T | WB | | |

---

Case B:

gfu instruction
alu_short r1, r2, r3
load r4, r5, r3
instrx r3, r6, r7

| cycle | 1 | 2 | 3 | 4 | 5 | 6 | 7 | 8 | 9 | 10 | 11 | 12 |
|---|---|---|---|---|---|---|---|---|---|---|---|---|
| alu_short | D | E | A1 | A2 | A3 | T | WB | | | | | |
| load | | D | E | A1 | A2 | A3 | T | WB | | | | |
| instrx | | | D | D | E | A1 | A2 | | | | | |

Here, load has output dependency on alu_short. If we assumed a dcache (data cache) hit and ld_buffer (the load buffer) to be empty, the earliest load data returns is in cycle 5. Instrx sees a load_use_immediate in its D-stage. Hence, it stalls in the D-stage for 1 cycle and enters the E-stage in cycle 5. Actual dcache hit data is bypassed through the muxes in cycle 4 and latched in the E-stage data flops (i.e. flip-flops).

If there is a load followed by an alu_long instruction or alu_long followed by a load with the same rd specifiers, as both instructions are scoreboarded, the younger instruction is always stalled in the D-stage till the older instruction is ready to reset the scoreboard. This is shown in the following table.

--- case C gfu instruction
load r1, r2, r3
alu_long r4, r5, r3
instrx r3, r6, r7

| | | | load -> alu_long -> instrx | | | | | | | | | |
|---|---|---|---|---|---|---|---|---|---|---|---|---|
| cycle | 1 | 2 | 3 | 4 | 5 | 6 | 7 | 8 | 9 | 10 | 11 | 12 | 13 |
| load | D | E | A1 | A2 | A3 | T | WB | | | | | | |
| alu_long | | D | D | D | E1 | E2 | E3 | E4 | E5 | E6 | A4 | WB | |
| instrx | | | | | D | D | D | D | D | D | E | | |

---

Here, let us assume that the load returns in cycle 3. Alu_long enters the scoreboard in cycle 4. (At the beginning of cycle 5, it is visible in the scoreboard). In cycle 5, instrx sees a scoreboard dependency with the long latency instruction and stalls in the D-stage.

| | | | load -> load -> instrx | | | | | | | | |
|---|---|---|---|---|---|---|---|---|---|---|---|
| cycle | 1 | 2 | 3 | 4 | 5 | 6 | 7 | 8 | 9 | 10 | 11 | 12 |
| load1 | D | E | A1 | A2 | A3 | T | WB | | | | | |
| load2 | | D | D | D | E | A1 | A2 | | | | | |
| instrx | | | | | D | E | E | A1 | | | | |

Let load1 and load2 be dcache hits returning data in the C/A1 stages. In cycle 6, instrx sees match in both the ldx1 and ldx4 stages of the load annex. Since the ldx1-stage has higher priority than ldx4, instrx bypasses data from the ldx1-stage. (This case is similar to case C with alu_long replaced by load2.)

--- case D gfu instruction
alu_long r1, r2, r3
load r4, r5, r3
instrx r3, r6, r7

-continued case D alu_long -> load -> instrx

| cycle    | 1 | 2  | 3  | 4  | 5  | 6  | 7  | 8  | 9  | 10 | 11 | 12 |
|----------|---|----|----|----|----|----|----|----|----|----|----|----|
| alu_long | D | E1 | E2 | E3 | E4 | E5 | E6 | A4 | WB |    |    |    |
| load     |   | D  | D  | D  | D  | D  | D  | E  | A1 | A2 |    |    |
| instrx   |   |    |    |    |    |    |    | D  | D  | E  |    |    |

In this case, instrx sees only one valid bypass from the LSU data or ld_annex (LDX).

Suppose there is an alu_long instruction followed by an alu_short/store instruction as shown below:

case E

```
gfu instruction
alu_long r1, r2, r3
alu_short r4, r5, r3
instrx r3, r6, r7
``` alu_long -> alu_short -> instrx (long_latency not bumped)

| cycle     | 1 | 2  | 3  | 4  | 5  | 6  | 7  | 8  | 9  | 10 | 11 | 12 |
|-----------|---|----|----|----|----|----|----|----|----|----|----|----|
| alu_long  | D | E1 | E2 | E3 | E4 | E5 | E6 | A4 | WB |    |    |    |
| alu_short |   | D  | D  | D  | D  | D  | D  | E  | A1 | A2 |    |    |
| instrx    |   |    |    |    |    |    |    | D  | E  | A1 |    |    | alu_long -> alu_short -> instrx (long_latency bumped)

| cycle     | 1 | 2  | 3  | 4  | 5  | 6  | 7  | 8  | 9  | 10 | 11 | 12 |
|-----------|---|----|----|----|----|----|----|----|----|----|----|----|
| alu_long  | D | E1 | E2 | E3 | E4 | E5 | E6 | E6 | A4 | WB |    |    |
| instrx    |   | D  | E  | A1 | A2 | A3 | T  | WB |    |    |    |    |
| alu_short |   |    | D  | D  | D  | D  | D  | E  | A1 |    |    |    |
| instrx    |   |    |    |    |    |    |    | D  | E  | A1 |    |    |

Case F

Suppose the instructions sequence is as follows:

```
gfu instruction
alu_short r1, r2, r3
alu_long r4, r5, r3
instrx r3, r6, r7
``` alu_short -> alu_long -> instrx (not bumped)

| cycle     | 1 | 2  | 3  | 4  | 5  | 6  | 7  | 8  | 9  | 10 | 11 | 12 |
|-----------|---|----|----|----|----|----|----|----|----|----|----|----|
| alu_short | D | E  | A1 | A2 | A3 | T  | WB |    |    |    |    |    |
| alu_long  |   | D  | E1 | E2 | E3 | E4 | E5 | E6 | A4 | WB |    |    |
| instrx    |   |    |    |    |    | D  | D  | D  | E  | A1 |    |    | alu_short -> alu_long -> instrx (bumped)

| cycle     | 1 | 2  | 3  | 4  | 5  | 6  | 7  | 8  | 9  | 10 | 11 | 12 |
|-----------|---|----|----|----|----|----|----|----|----|----|----|----|
| alu_short | D | E  | A1 | A2 | A3 | T  | WB |    |    |    |    |    |
| alu_long  |   | D  | E1 | E2 | E3 | E4 | E5 | E6 | E6 | E6 | A4 | WB |
| instr1    |   |    | D  | E  | A1 | A2 | A3 | T  | WB |    |    |    |
| instr2    |   |    |    | D  | E  | A1 | A2 | A3 | T  | WB |    |    |
| instr3    |   |    |    |    | D  | E  | A1 | A2 | A3 | T  | WB |    |
| instrx (not load not long) |   |    |    |    |    | D  | D  | D  | E  | A1 | A2 | A3 |

We claim:

1. A processor comprising:
a first instruction execution circuit providing at most N1 instruction results at any given time;
a second instruction execution circuit; and
a write circuit for writing instruction results from the first and second circuits to a result destination or destinations;
wherein the write circuit is operable to write more than N1 instruction results from the first circuit while a result of the second circuit is waiting to be written.

2. The processor of claim 1 wherein a result of the second circuit is written by the write circuit only when there is no first circuit result available to be written by the write circuit.

3. The processor of claim 1 wherein an average program executed by the processor has more instructions executed by the first circuit than by the second circuit.

4. The processor of claim 1 wherein the second circuit is to execute instructions that perform floating point division and reciprocal square root computations, but the second circuit is not to execute any instructions that perform only addition, multiplication, or logic operations.

5. The processor of claim 1 wherein the first and second circuits are operable in parallel.

6. The processor of claim 1 further comprising an interlock circuit to enforce an output dependency of an instruction on a previous instruction executed by the second circuit;
wherein no interlock is implemented to enforce any dependency on any instruction executed by the first circuit.

7. The processor of claim 6 wherein the interlock circuit comprises a scoreboard having only one entry for instructions executed by the second circuit.

8. The processor of claim 6 wherein the processor is a VLIW (very long instruction word) processor for executing VLIW instruction packets each of which includes one or more instructions, and at most one instruction is to be issued to the first and second circuits at any given time.

9. The processor of claim 8 wherein, when a result of an instruction I1 executed by the second circuit is waiting to be written while results from the first circuit are written by the write circuit, the processor is operable to execute VLIW packets that follow the instruction I1 in a sequential VLIW packet stream executed by the processor.

10. The processor of claim 8 wherein results of instructions executed by the second circuit are bypassed to processor circuitry executing one or more other instructions before the results are written by the write circuit.

11. The processor of claim 1 wherein at least one instruction executable by the first circuit and at least one instruction executable by the second circuit have different latencies, the latencies being measured assuming the instructions are not stalled, each latency being measured from the time an instruction is received by the respective first or second circuit to the time the instruction result is available to be written by the write circuit.

12. The processor of claim 11 wherein each instruction executable by the second circuit has a longer latency than any instruction executable by the first circuit, the latencies being measured assuming the instructions are not stalled, each latency being measured from the time an instruction is received by the respective first or second circuit to the time the instruction result is available to be written by the write circuit.

13. The processor of claim 12 wherein the second circuit comprises a plurality of instruction execution circuits of different circuit latencies.

14. The processor of claim 1 wherein the first circuit includes at least one instruction execution pipeline, with different pipeline stages operable to execute different instructions in parallel.

15. The processor of claim 1 wherein the write circuit is operable to write instruction results out of order so that a result of a preceding instruction executed by the second circuit is waiting to be written while the write circuit writes results of subsequent instructions executed by the first circuit.

16. The processor of claim 1 wherein N1=1.

17. The processor of claim 1 wherein the write circuit is capable to write no more than N1 instruction results from the first and second circuits at a time.

18. A method for executing computer instructions, the method comprising:
  executing instructions by a first instruction execution circuit which provides at most N1 instruction results at any given time;
  executing instructions by a second instruction execution circuit; and
  writing instruction results from the first and second circuits to a result destination or destinations,
  wherein the writing comprises writing more than N1 instruction results from the first circuit while a result of the second circuit is waiting to be written.

19. The method of claim 18 wherein the result of the second circuit is written only when there is no first circuit result available to be written.

20. The method of claim 18 wherein the second circuit executes instructions that perform floating point division and reciprocal square root computations, but the second circuit does not execute any instructions that perform only addition, multiplication, or logic operations.

21. The method of claim 18 wherein the first and second circuits operate in parallel.

22. The method of claim 18 further comprising using an interlock to enforce a dependency of an instruction on a previous instruction executed by the second circuit;
  wherein no interlock is implemented to enforce any dependencies on any instruction executed by the first circuit.

23. The method of claim 22 wherein the first and second circuits are portions of a VLIW processor, and at most one instruction is issued to the first and second circuits at any given time.

24. The method of claim 18 wherein at least one instruction executed by the first circuit and at least one instruction executed by the second circuit have different latencies, the latencies being measured assuming the instructions are not stalled, each latency being measured from the time an instruction is received by the respective first or second circuit to the time the instruction result is available to be written to a destination.

25. The method of claim 24 wherein each instruction executed by the second circuit has a longer latency than any instruction executed by the first circuit, the latencies being measured assuming the instructions are not stalled, each latency being measured from the time an instruction is received by the respective first or second circuit to the time the instruction result is available to be written to a destination.

26. The method of claim 25 wherein the second circuit comprises a plurality of instruction execution circuits of different circuit latencies.

27. The method of claim 18 wherein at least some instruction results are written to their destination or destinations out of order so that a result of a proceeding instruction executed by the second circuit is waiting to be written while the results of subsequent instructions executed by the first circuit are written.

28. The method of claim 18 wherein N1=1.

* * * * *